(12) United States Patent
Kuwasaki (10) Patent No.: US 8,199,353 B2
(45) Date of Patent: Jun. 12, 2012

(54) DISPLAYING STATUS ICONS OF REMAINING CONSUMABLES FOR PLURAL IMAGE FORMING APPARATUSES

(75) Inventor: Naoki Kuwasaki, Osaka (JP)

(73) Assignee: KYOCERA Document Solutions Inc. (JP)

( * ) Notice: Subject to any disclaimer, the term of this patent is extended or adjusted under 35 U.S.C. 154(b) by 492 days.

(21) Appl. No.: 12/474,148

(22) Filed: May 28, 2009

(65) Prior Publication Data

US 2010/0074633 A1    Mar. 25, 2010

(30) Foreign Application Priority Data

Sep. 25, 2008   (JP) ................................. 2008-246641

(51) Int. Cl.
*G06F 3/12* (2006.01)
*G06F 15/00* (2006.01)
*G03G 15/00* (2006.01)
*G03G 15/08* (2006.01)
*G03G 21/00* (2006.01)

(52) U.S. Cl. ..................... 358/1.15; 358/1.13; 358/1.14; 358/1.18; 399/10; 399/11; 399/27; 399/81; 399/99

(58) Field of Classification Search ........................ None
See application file for complete search history.

(56) References Cited

U.S. PATENT DOCUMENTS

| | | | | |
|---|---|---|---|---|
| 5,797,061 | A * | 8/1998 | Overall et al. | .................. 399/27 |
| 2003/0200035 | A1 | 10/2003 | Niki | |
| 2003/0229691 | A1 * | 12/2003 | Ishimoto | ........................ 709/223 |
| 2005/0168765 | A1 * | 8/2005 | Akune et al. | .................. 358/1.13 |
| 2006/0224559 | A1 * | 10/2006 | Abiko | .................. 707/1 |
| 2007/0092267 | A1 * | 4/2007 | Yonenaga | ........................ 399/8 |
| 2009/0185814 | A1 * | 7/2009 | Willis | ............................... 399/27 |

FOREIGN PATENT DOCUMENTS

| | | |
|---|---|---|
| CN | 1453730 | 11/2003 |
| JP | 2000-148432 | 5/2000 |
| JP | 2004-038856 | 2/2004 |
| JP | 2005-138347 | 6/2005 |

OTHER PUBLICATIONS

Sekiya et al.;"Network Management Device";JP Pub Date May 2000; Machine translation in english for JP Pub 2000-148432.*

* cited by examiner

*Primary Examiner* — Benny Q Tieu
*Assistant Examiner* — Haris Sabah
(74) *Attorney, Agent, or Firm* — McDonnell Boehnen Hulbert & Berghoff LLP (57) ABSTRACT

An image forming system includes a plurality of image forming apparatuses and an information processing apparatus connected to a network. Each image forming apparatus includes a remaining-toner sensor for detecting remaining amounts of toner in cyan (C), magenta (M), yellow (Y), and black (K) toner cartridges. The information processing apparatus includes (i) a storage device for storing various types of information obtained from the image forming apparatuses, including apparatus status information such as the remaining amounts of toner, and (ii) a display device for displaying icons representing the remaining amounts of C/M/Y/K toners in a line on a respective apparatus basis, and displaying the icons representing the remaining amounts of C/M/Y/K toners for all of the plurality of image forming apparatuses in lines on a respective color basis so that said lines are perpendicular to said line in which the icons representing the remaining amounts of toner are displayed.

20 Claims, 9 Drawing Sheets

[FIG. 1]

| | | APPARATUS IDENTIFYING INFORMATION | MODEL NAME | TONER LEVEL |
|---|---|---|---|---|
| ▷ | ⊘ | A1 | FS-4020DN | |
| ▷ | ⊘ | A2 | FS-9570DN | |
| ▷ | ✓ | A3 | FS-C5100DN | |
| ▷ | ⊘ | A4 | FS-C5100DN | |
| ▷ | ✓ | B1 | FS-C5200DN | |
| ▷ | ✓ | B2 | FS-C5200DN | |
| ▷ | ⊘ | C1 | FS-C5700DN | |
| ▷ | ⊘ | C2 | FS-C8100DN | |
| ▷ | ✗ | C3 | KM-C3232E | |
| ▷ | ✓ | D1 | KM-C4035E | |
| ▷ | ✓ | D2 | KM-C4035E | |
| ▷ | ✓ | D3 | KM-C4035E(J) | |
| ▷ | ⏰ | D4 | KM-C4035E | |
| ▷ | ✓ | D5 | KM-C4035E | |
| ▷ | ✓ | D6 | LS-C503N | |
| ▷ | ⊘ | E1 | LS-C503N | |

| | | APPARATUS IDENTIFYING INFORMATION | MODEL NAME | TONER LEVEL | |
|---|---|---|---|---|---|
| ▷ | ⊘ | A1 | FS-4020DN | | |
| ▷ | ⊘ | A2 | FS-9570DN | | |
| ▷ | ✓ | A3 | FS-C5100DN | | |
| ▷ | ⊘ | A4 | FS-C5100DN | | |
| ▷ | ✓ | B1 | FS-C5200DN | | |
| ▷ | ✓ | B2 | FS-C5200DN | | |
| ▷ | ⊘ | C1 | FS-C5700DN | | |
| ▷ | ⊘ | C2 | FS-C8100DN | | |
| ▷ | ⊗ | C3 | KM-C3232E | | |
| ▷ | ✓ | D1 | KM-C4035E | | |
| ▷ | ✓ | D2 | KM-C4035E | | |
| ▷ | ✓ | D3 | KM-C4035E(J) | | |
| ▷ | ⊙ | D4 | KM-C4035E | | |
| ▷ | ✓ | D5 | KM-C4035E | | |
| ▷ | ✓ | D6 | LS-C503N | | |
| ▷ | ⊘ | E1 | LS-C503N | | |

[FIG. 8]

| APPARATUS IDENTIFYING INFORMATION | MODEL NAME | C/M PPM | TONER LEVEL | | WAITING TIME (m) | PUNCHING | STAPLING |
|---|---|---|---|---|---|---|---|
| A1 | FS-4020DN | 20/25 | | | | NOT AVAILABLE | NOT AVAILABLE |
| A2 | FS-9570DN | 30/30 | | | | NOT AVAILABLE | AVAILABLE |
| A3 | FS-C5100DN | 25/30 | | | 2 | NOT AVAILABLE | AVAILABLE |
| A4 | FS-C5100DN | 25/30 | | | | NOT AVAILABLE | AVAILABLE |
| B1 | FS-C5200DN | 28/35 | | | 8 | NOT AVAILABLE | AVAILABLE |
| B2 | FS-C5200DN | 28/35 | | | 0 | NOT AVAILABLE | AVAILABLE |
| C1 | FS-C5700DN | 30/30 | | | | AVAILABLE | AVAILABLE |
| C2 | FS-C8100DN | 35/40 | | | | AVAILABLE | AVAILABLE |
| C3 | KM-C3232E | 32/32 | | | | AVAILABLE | AVAILABLE |
| D1 | KM-C4035E | 35/40 | | | 12 | AVAILABLE | AVAILABLE |
| D2 | KM-C4035E | 35/40 | | | 0 | AVAILABLE | AVAILABLE |
| D3 | KM-C4035E | 35/40 | | | 1 | AVAILABLE | AVAILABLE |
| D4 | KM-C4035E | 35/40 | | | | AVAILABLE | AVAILABLE |
| D5 | KM-C4035E | 35/40 | | | 2 | AVAILABLE | AVAILABLE |
| D6 | LS-C503N | 24/24 | | | 2 | NOT AVAILABLE | NOT AVAILABLE |
| E1 | LS-C503N | 24/24 | | | | NOT AVAILABLE | NOT AVAILABLE |

[FIG. 9]

DISPLAYING STATUS ICONS OF REMAINING CONSUMABLES FOR PLURAL IMAGE FORMING APPARATUSES

INCORPORATION BY REFERENCE

This application is based upon and claims the benefit of priority from the corresponding Japanese Patent Application No. 2008-246641, filed Sep. 25, 2008, the entire contents of which is incorporated herein by reference.

BACKGROUND

1. Field of the Invention

The present invention relates to an image forming system.

2. Description of the Related Art

In an image forming system in which a plurality of image forming apparatuses and a personal computer (PC) are connected via a network, one of the image forming apparatuses can be selected using the PC. In this case, a user can do a wide range selection of image forming apparatuses, which allows the user to easily and quickly select one of the image forming apparatuses.

For example, when a user wishes to immediately print a large number of color images containing a large amount of magenta, the user may wish to easily and quickly search for an image forming apparatus with a high processing speed from among image forming apparatuses having large remaining amounts of magenta toner.

In order to meet this demand, Japanese Laid-Open Patent Application No. 1998-317613 discloses a network management device which is configured to read remaining amounts of toner of image forming apparatuses from a database and to display images of remaining-amount indicators in the vicinity of images of the image forming apparatuses displayed on a screen. In this network management device, however, the images of the remaining-amount indicators are displayed in a scattered manner over the screen.

In the techniques described above, therefore, it is difficult for a user to easily and quickly select one of image forming apparatuses on the network.

SUMMARY

The present invention relates to an image forming system which allows a user to easily and quickly select a desired image forming apparatus from among a plurality of image forming apparatuses on a network for printing a document. The present invention further relates to an image forming system which allows a manager to easily and quickly manage remaining amounts of toner for a plurality of image forming apparatuses on the network.

According to an embodiment of the present invention, an image forming system includes a plurality of image forming apparatuses connected to a network, and an information processing apparatus connected to the network.

Each image forming apparatus within the plurality of image forming apparatuses includes a remaining-toner sensor for detecting remaining amounts of toner for cyan, magenta, yellow, and black in toner cartridges.

The information processing apparatus includes a storage device for storing various types of information regarding each of the plurality of image forming apparatuses obtained from the image forming apparatuses via the network. The various types of information obtained from the image forming apparatuses include apparatus status information and apparatus identifying information, the apparatus status information including the remaining amounts of toner. The information processing apparatus also includes a display device for displaying icons representing the remaining amounts of toner for cyan, magenta, yellow, and black in a line on a respective apparatus basis, and displaying the icons representing the remaining amounts of toner for all of the plurality of image forming apparatuses in lines on a respective color basis so that said lines are perpendicular to said line in which the icons representing the remaining amounts of toner are displayed.

Additional features and advantages are described herein, and will be apparent from the following Detailed Description and the figures.

DETAILED DESCRIPTION

First Embodiment

Figure 4:
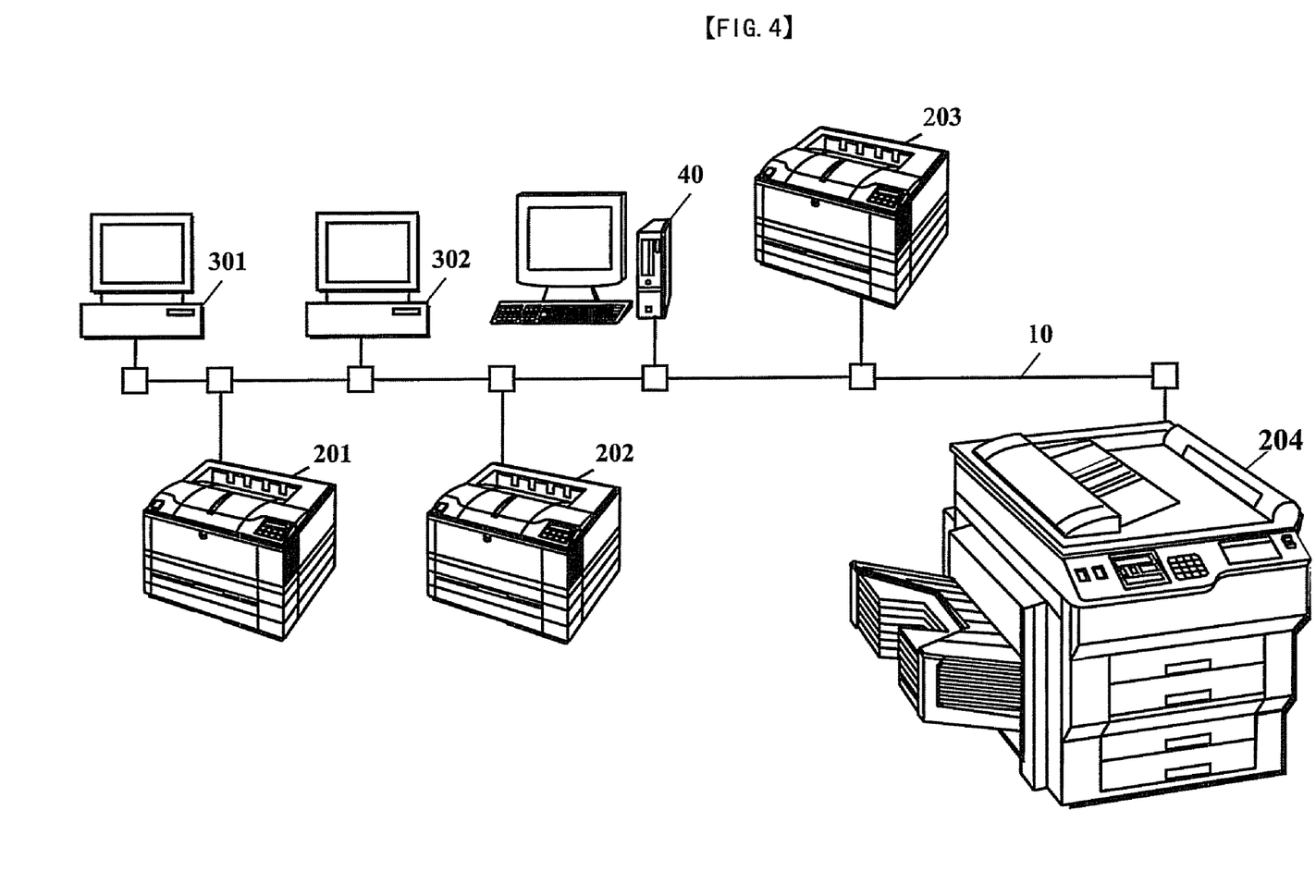
FIG. 4 is a schematic diagram of a configuration of an image forming system according to a first embodiment of the present invention.

FIG. 4 is a schematic diagram of a configuration of an image forming system according to a first embodiment of the present invention.

In the image forming system, image forming apparatuses 201 to 204, PC 301 and PC 302, and a management apparatus 40 are connected to a local area network (LAN) 10. Image forming apparatuses 201 to 204 can be selectively used from PC 301 and PC 302. The management apparatus 40 collects various types of information, such as information regarding users of the image forming apparatuses 201 to 204, the number of sheets to be used, the remaining amounts of toner, and the occurrence of an error, via the LAN 10 so that the management information can be centralized. Further, among the various types of information collected by the management apparatus 40, apparatus status information such as the remaining amounts of toner and the occurrence of an error, apparatus identifying information, and apparatus performance information are transferred to PC 301 or 302 in accordance with a request from PC 301 or 302.

In FIG. 4, for simplicity, some of a plurality of PCs and image forming apparatuses connected to the LAN 10 are illustrated. The image forming apparatuses may be monochrome or color image forming apparatuses.

Figure 5:
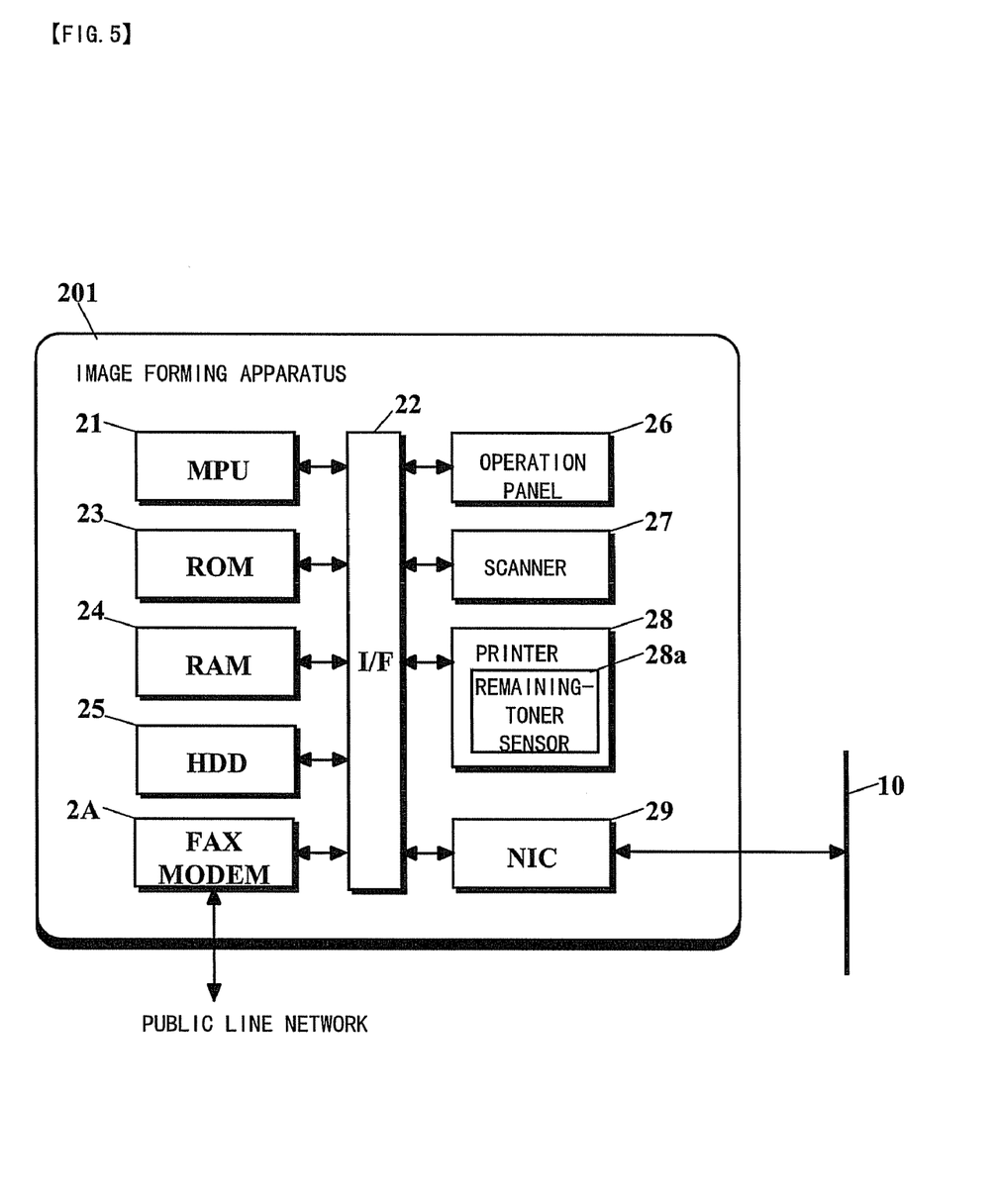
FIG. 5 is a schematic block diagram illustrating a hardware configuration of an image forming apparatus.

FIG. 5 is a schematic block diagram illustrating a hardware configuration of the image forming apparatus 201.

In the image forming apparatus 201, a micro processing unit (MPU) 21 is connected to a read only memory (ROM) 23, a random access memory (RAM) 24, a hard disk drive (HDD) 25, an operation panel 26, a scanner 27, a printer 28, a network interface card (NIC) 29, and a facsimile (FAX) modem 2A through an interface (I/F) 22. In FIG. 5, for simplicity, a plurality of interfaces are represented by a single block, namely, the I/F 22.

The ROM 23 may be an electrically erasable and programmable read only memory (EEPROM) such as, for example, a flash memory. The ROM 23 stores an operating system (OS), various drivers, applications for controlling the operation panel 26, the scanner 27, the printer 28, and/or the FAX modem 2A to implement their functions, and various types of setting information used for the functions. The RAM 24 is used as a work area. The HDD 25 is used to store image data. The operation panel 26 is configured to allow a user to operate the scanner 27, the printer 28, and the FAX modem 2A, and includes a plurality of operation keys and display units. The scanner 27 is used to create an image file or input an image to the printer 28 or the FAX modem 2A. The image forming apparatus 201 is connected to the LAN 10 through the NIC 29.

The printer 28 has toner cartridges for cyan (C), magenta (M), yellow (Y), and black (K) colors. The printer 28 is provided with a remaining-toner sensor 28a for the toner cartridges for C/M/Y/K colors. When the NIC 29 receives a request message via the LAN 10, the MPU 21 reads a request message through the I/F 22. When the request message is a request for detecting the remaining amounts of toner, the MPU 21 reads the remaining amounts of toner for C/M/Y/K colors using the remaining-toner sensor 28a through the interface 22, and returns a response message including the detected values to the management apparatus 40 through the I/F 22 and the NIC 29.

It should be noted that the MPU 21 may transfer abnormal apparatus status information to the management apparatus 40 even when no request message is received.

The other image forming apparatuses illustrated in FIG. 4, namely, the image forming apparatuses 202, 203, and 204, have a configuration similar to the image forming apparatus 201.

Figure 6:
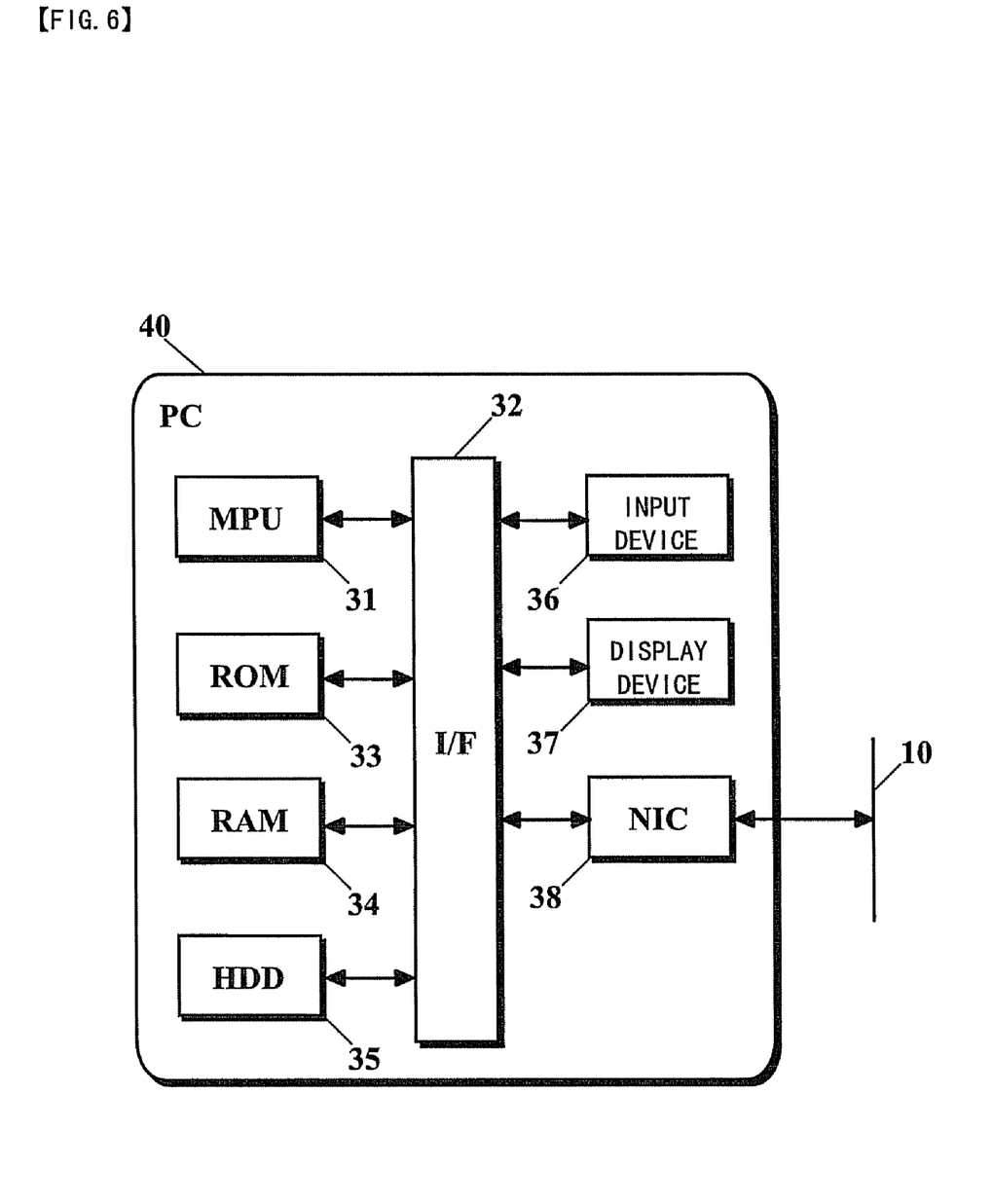
FIG. 6 is a schematic block diagram illustrating a hardware configuration of a management apparatus.

FIG. 6 is a schematic block diagram illustrating a hardware configuration of the management apparatus 40 (an example of an information processing apparatus). In the management apparatus 40, an MPU 31 is connected to a ROM 33, a RAM 34, an HDD 35, an input device 36, a display device 37 (an example of a display device), and a NIC 38 through an I/F 32.

The HDD 35 (an example of a storage device) stores a virtual memory OS, various drivers, applications, and various types of information. The applications include a program for displaying the various types of information and for operating the image forming apparatus on the LAN 10.

The various types of information include information regarding each of the image forming apparatuses 201, 202, 203 and 204 obtained from the image forming apparatuses via the LAN 10. The various types of information include apparatus identifying information, apparatus communication information, apparatus performance information, and apparatus status information.

It should be noted that the apparatus identifying information, the apparatus communication information, and the apparatus performance information may be a file that is provided from a vendor and that is stored in the HDD 35.

The apparatus status information may be information indicating statuses such as the remaining amounts of toner, the network connection state, and the abnormal state or ready-to-operate state of the image forming apparatuses. The apparatus status information is received from each of the image forming apparatuses 201, 202, 203 and 204 in response to a request message sent to the image forming apparatuses 201, 202, 203 and 204.

The ROM 33 stores a bootstrap program for loading the OS in the HDD 35 onto the RAM 34. The input device 36 includes, for example, a keyboard and a pointing device. The management apparatus 40 is connected to the LAN 10 through the NIC interface 38.

The other PCs illustrated in FIG. 4, namely, PC 301 and PC 302, have a configuration similar to the management apparatus 40.

Figure 3:
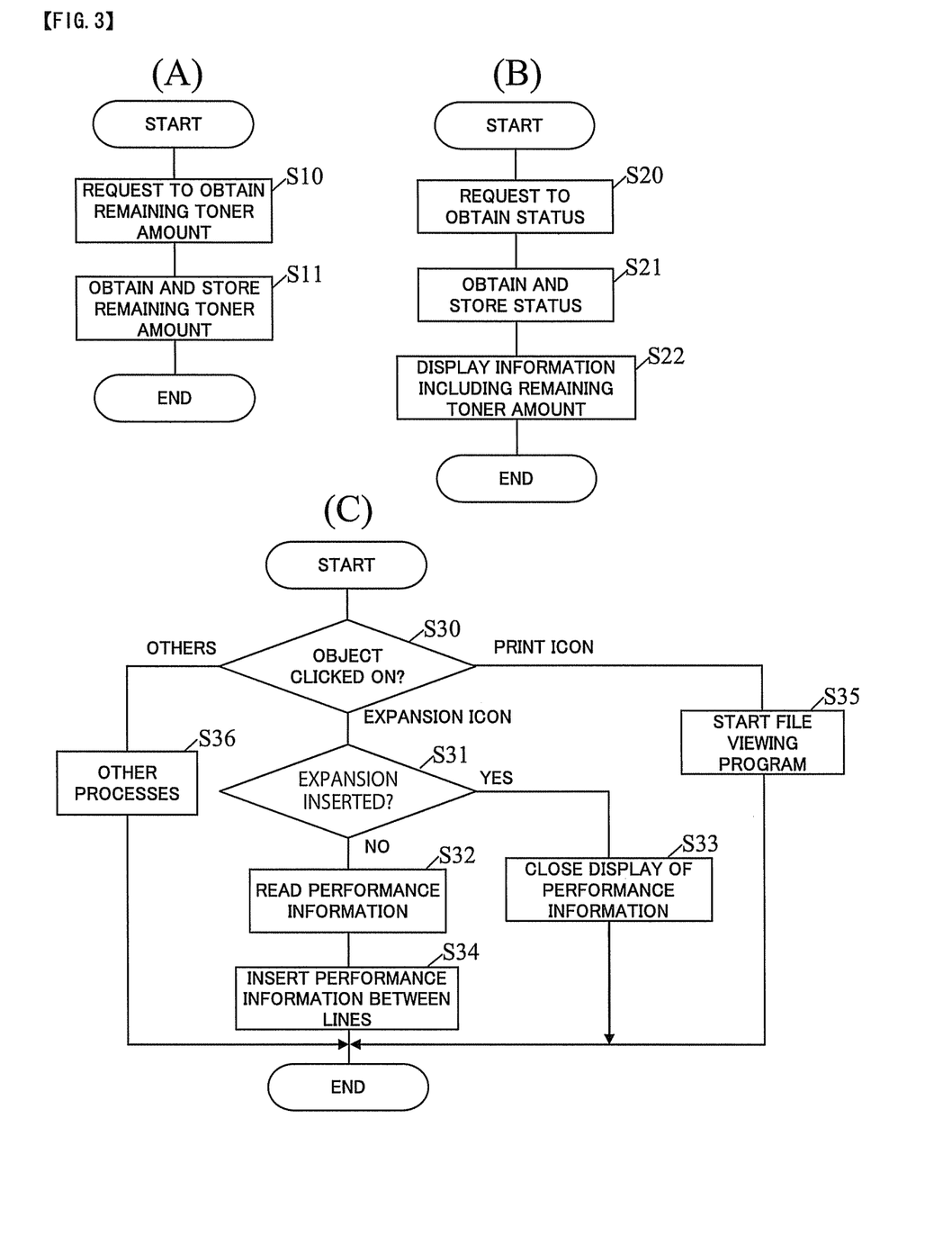
FIG. 3(A) is a schematic flowchart illustrating a process in which a management apparatus obtains remaining toner amount information from image forming apparatuses.
FIG. 3(B) is a schematic flowchart illustrating a process of a program executed on a management apparatus for obtaining and displaying the various types of information regarding each of a plurality of image forming apparatuses obtained from the image forming apparatuses via a network.
FIG. 3(C) is a schematic flowchart of an event handler process that is started when a user clicks a pointing device on the display screen illustrated in FIG. 1.

FIG. 3(A) is a schematic flowchart illustrating a process in which the management apparatus 40 obtains remaining toner amount information from image forming apparatuses. The process is started in response to the occurrence of an interval timer event.

(Step S10) The management apparatus 40 sends a request message to each of the image forming apparatuses to obtain the remaining amounts of toner.

(Step S11) Upon obtaining a response message to the request message, the management apparatus 40 stores the content of the response message in an internal HDD thereof. If the management apparatus 40 fails to obtain the response message, information indicating that the corresponding image forming apparatus has been disconnected from the LAN 10 is stored in the HDD.

FIG. 3(B) is a schematic flowchart illustrating a process of a program executed on a management apparatus 40 for obtaining and displaying the various types of information regarding each of a plurality of image forming apparatuses obtained from the image forming apparatuses via a network. When a manager causes a program for obtaining and displaying the various types of information to start on the management apparatus 40, the process illustrated in FIG. 3(B) is started.

(Step S20) The MPU 31 of the management apparatus 40 sends a request message to the image forming apparatuses to obtain apparatus status information regarding each of the image forming apparatuses, including remaining toner amounts information, network connection information, and/or information regarding the abnormal state or ready-to-operate state of the image forming apparatuses.

Figure 1:
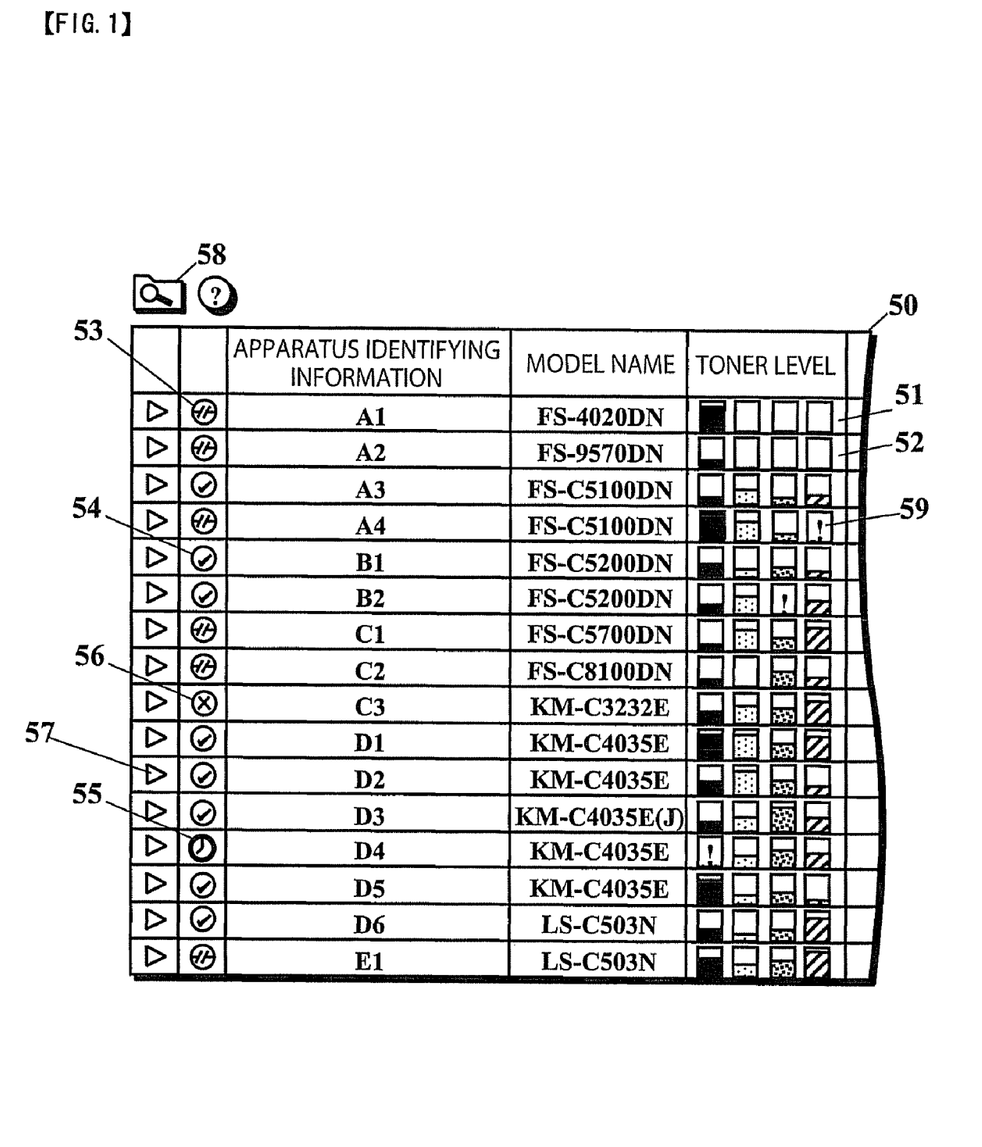
FIG. 1 is a schematic diagram of a display screen on which various types of information regarding each of a plurality of image forming apparatuses obtained from the image forming apparatus via a network is displayed according to a first embodiment of the present invention.

(Step S21) The MPU 31 reads information in a response message to the request message and the apparatus identifying information and apparatus performance information stored in the HDD 35, and displays a display screen 50 illustrated in FIG. 1 on which information regarding each of the image forming apparatuses on the network is displayed.

FIG. 1 is a schematic diagram of a display screen 50 on which various types of information regarding each of a plurality of image forming apparatuses obtained from the image forming apparatus via a network is displayed.

Figure 2:
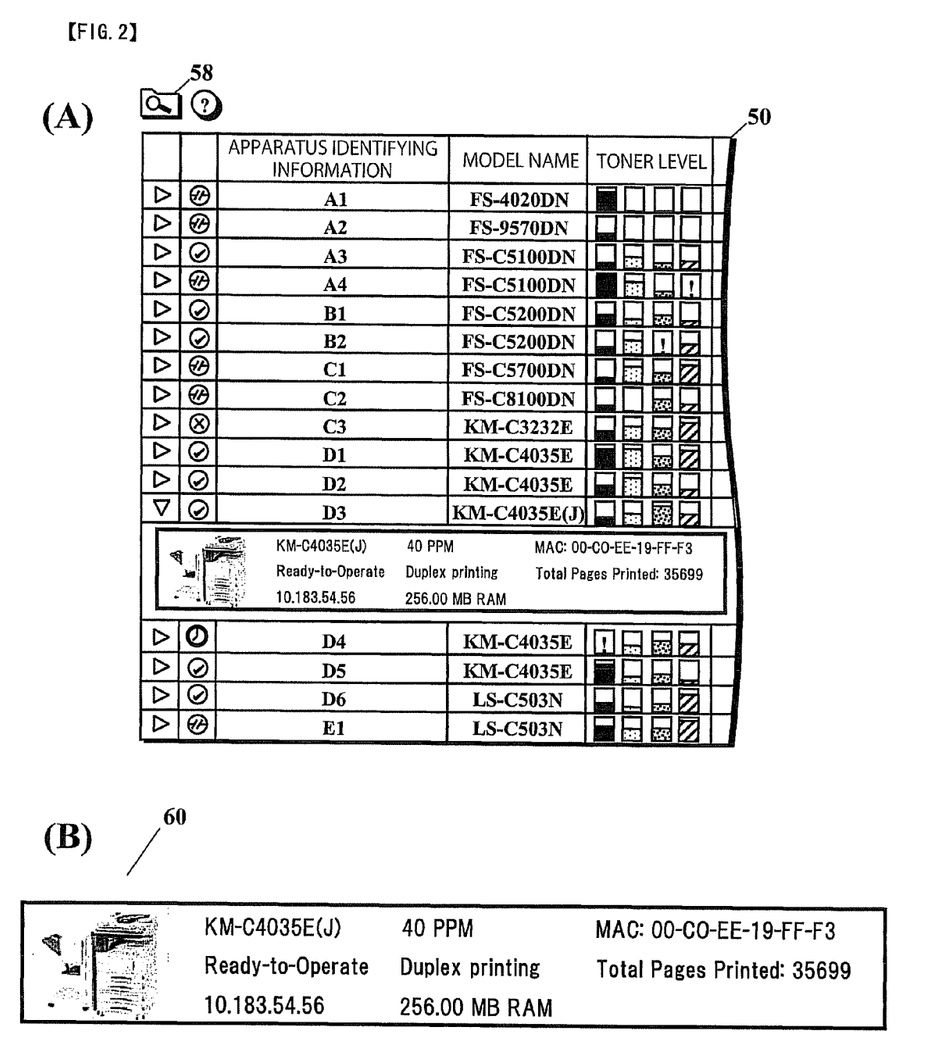
FIG. 2(A) is a schematic diagram of the display screen on which the various types of information regarding each of a plurality of image forming apparatuses obtained from the image forming apparatuses via a network is displayed when apparatus performance information is inserted between a selected line and a line adjacent to the selected line.
FIG. 2(B) is an enlarged view of the apparatus performance information.

FIG. 2(A) is a schematic diagram of the display screen on which the various types of information regarding each of a plurality of image forming apparatuses obtained from the image forming apparatuses via a network is displayed when apparatus performance information is inserted between a selected line and a line adjacent to the selected line.

FIG. 2(B) is an enlarged view of the apparatus performance information.

On the display screen 50 illustrated in FIG. 1, icons representing toner levels of C/M/Y/K toner cartridges for each image forming apparatus are displayed in a line on a respective apparatus basis. Additionally, the icons representing toner levels for all of the image forming apparatuses on the network are displayed in lines on a respective color basis so that said lines are perpendicular to said line in which the icons representing the remaining amounts of toner are displayed.

The toner levels are displayed with colors in such a manner that icons representing the C/M/Y/K toner cartridges are filled with colors corresponding to the C/M/Y/K toner colors, respectively. The icons are filled with the colors up to the heights which indicate the remaining amounts of toner in the C/M/Y/K toner cartridges.

Accordingly, icons representing C/M/Y/K toner cartridges for a plurality of image forming apparatuses on the network are displayed in a line so that the icons are displayed separately for each of the C/M/Y/K toner colors. This allows a user to easily and quickly select a desired one of a plurality of image forming apparatuses for printing a document. This also allows a manager to easily and quickly manage the statuses of all the toner cartridges for the image forming apparatuses on the network. Thus, the manager can easily and quickly perform management such as ordering and replacing a toner cartridge.

In the icons, exclamation mark ("!") 59 indicates that toner is empty or, for example, that the remaining toner percentage is 2% or less. For a monochrome image forming apparatus, only the remaining amount of toner for K may be displayed using an icon and the remaining amounts of toner for C/M/Y may be displayed using empty icons. Further, when a toner cartridge is not mounted in the image forming apparatus, a mark "X" is shown in an icon representing this toner cartridge.

In FIG. 1, apparatus identifying information and model names are displayed as information associated with toner levels. Any apparatus identifying information capable of identifying each of the image forming apparatuses may be used, such as an apparatus identifier (ID) assigned by the manager, the name of the place where the image forming apparatus is installed, an internet protocol (IP) address, or a host name corresponding to the IP address. Image forming apparatuses with apparatus identifying information "A1" and "A2" have no color printing capabilities, and therefore empty icons 51 and 52 representing C/M/Y toner levels are displayed.

For example, when a user wishes to print a large number of images containing a large amount of magenta, the user searches for an image forming apparatus having a relatively high magenta toner level by referring to the icons displayed in a line associated with the magenta toner color. Then, the user selects an image forming apparatus that is ready to operate by referring to apparatus state icons aligned in the second-from-left column of the display screen 50.

The apparatus state icons include, for example, an icon 53 indicating the state of being disconnected from the network, and icons 54 and 55 indicating the state of being connected to the network. The icon 54 indicates a ready state and the icon 55 indicates a busy state (for example, the image forming apparatus is printing a document). The apparatus state icons further include an icon 56 indicating the abnormal state of an image forming apparatus.

For example, assume that a user wants to select one of the image forming apparatuses with apparatus identifying information D1 and D3. The user may want to select the image forming apparatus that has a higher printing performance. If the user is able to determine the performances of the image forming apparatuses on the basis of their model names, the user can select one of the image forming apparatuses by referring to the model names displayed in the column to the left of the column in which the icons representing the toner levels are displayed. After selecting one of the image forming apparatuses, the user clicks on a file viewing icon 58 located at the upper left position of the display screen 50 by using the pointing device to select a folder and a file to be printed within the folder. Therefore, the user can print the selected file using an application associated with the file.

FIG. 3(C) is a schematic flowchart of an event handler process that is started in response to an event that has occurred when the user clicks the pointing device on the display screen 50 illustrated in FIG. 1.

(Step S30) When the object clicked on is an expansion icon 57, the MPU 31 proceeds to step S31. When the object clicked on is the file viewing icon 58, the MPU 31 proceeds to step S35. Otherwise, the MPU 31 proceeds to step S36.

If the user does not understand the performances based on the model names or if the user desires more detailed information about the performances, the user clicks on one of the expansion icons 57 by using the pointing device. The expansion icons 57 are indicated by triangle marks displayed in the left column in the display screen 50.

(Step S31) When no expansion is inserted between a line selected by the clicking on one of the expansion icons 57 and a lower adjacent line, the MPU 31 proceeds to step S32. Otherwise, the MPU 31 proceeds to step S33.

(Step S32) The MPU 31 reads the apparatus performance information regarding the corresponding image forming apparatus from the HDD 35, and proceeds to step S34.

(Step S33) The MPU 31 closes the display of the apparatus performance information between the lines to return to the state illustrated in FIG. 1, and ends the event handler process.

(Step S34) The MPU 31 inserts the apparatus performance information read in step S32 between the selected line and the lower adjacent line. Therefore, as illustrated in FIG. 2(A), a space between the line selected by clicking on the expansion icon 57 and the lower adjacent line is opened up in an accordion-like fashion, and the apparatus performance information regarding the image forming apparatus corresponding to the selected line is displayed in the inserted space. FIG. 2(B) illustrates the apparatus performance information in an enlarged scale.

An example of the apparatus performance information illustrated in FIG. 2(A) includes information indicating that the printing speed is 40 pages per minute (PPM), that the duplex printing function is available, and that the RAM storage capacity is 256 megabytes (MB). In order to print a high-resolution color image, it is desirable that an image forming apparatus having a large RAM storage capacity be selected to reduce the image processing time. The user can also use the expansion icons 57 to display apparatus performance information regarding all image forming apparatuses in the display screen 50 in a similar manner described above.

As illustrated in FIG. 2(A), in addition to the apparatus performance information, apparatus identifying information such as a model name and an address, or apparatus status information such as the ready-to-operate state of an image forming apparatus or the total number of printed pages may also be displayed.

Then, the MPU 31 ends the event handler process.

(Step S35) The MPU 31 starts a file viewing program, and ends the event handler process. A pop-up dialog is displayed according to the file viewing program, and a user operation is performed on the dialog to select a file. Then, when a print icon in the dialog is clicked on, the file viewing program calls the functions of the OS so that the selected file can be printed using the application associated with the extension of the selected file.

(Step S36) Other processes are performed.

Second Embodiment

Figure 7:
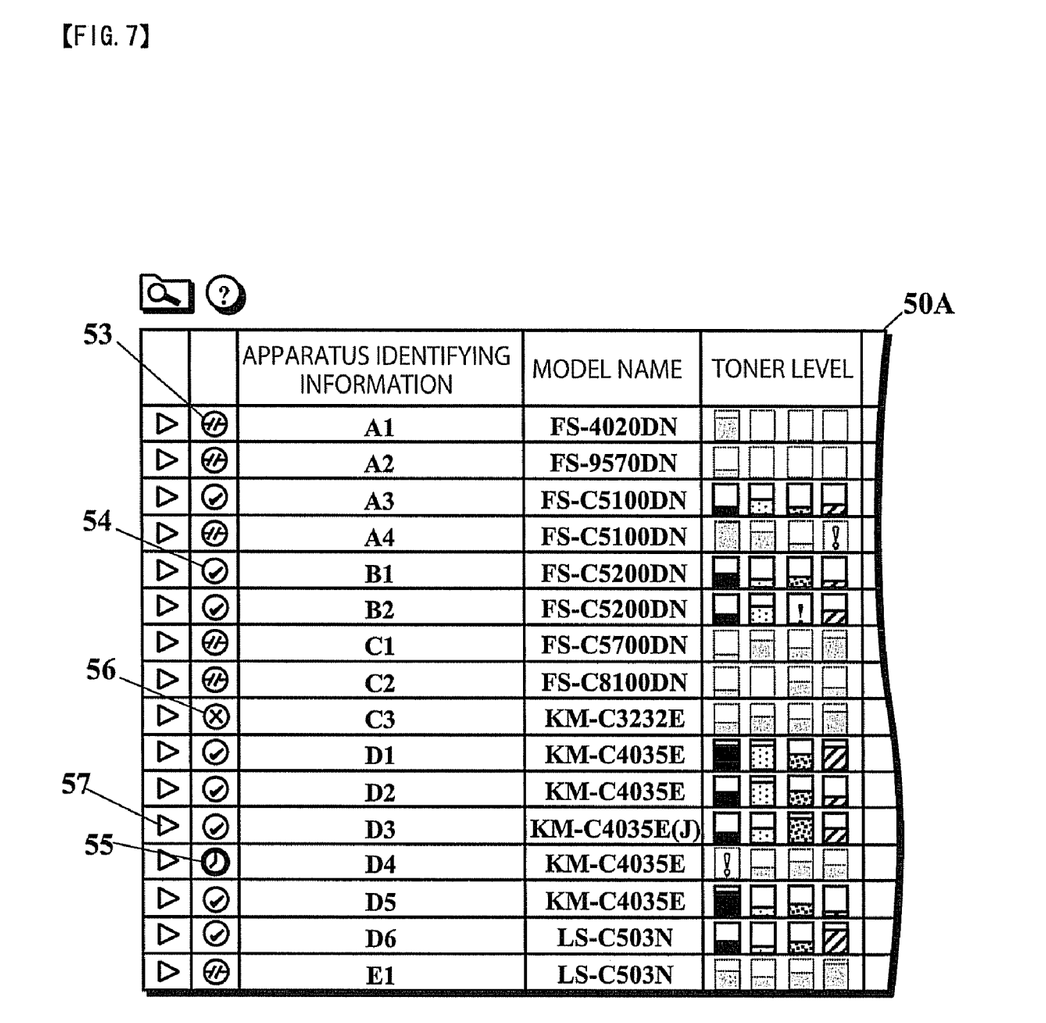
FIG. 7 is a schematic diagram of a display screen on which various types of information regarding each of the plurality of image forming apparatuses obtained from the image forming apparatus via a network is displayed according to a second embodiment of the present invention.

FIG. 7 is a display screen 50A on which various types of information regarding each of the plurality of image forming apparatuses obtained from the image forming apparatuses via a network is displayed according to a second embodiment of the present invention. The display screen 50A corresponds to the display screen 50 illustrated in FIG. 1.

In the display screen 50A, when an image forming apparatus is disconnected from a network or is in an abnormal state, icons representing toner levels for the image forming apparatuses are grayed out (display inactive). This allows a user to select an image forming apparatus without referring to apparatus state icons 53 to 56.

The present configuration is similar to that of the first embodiment described above. That is, when an expansion icon 57 is clicked on, detailed performance information can be displayed in an accordion-like fashion similar to that of the first embodiment.

Third Embodiment

Figure 8:
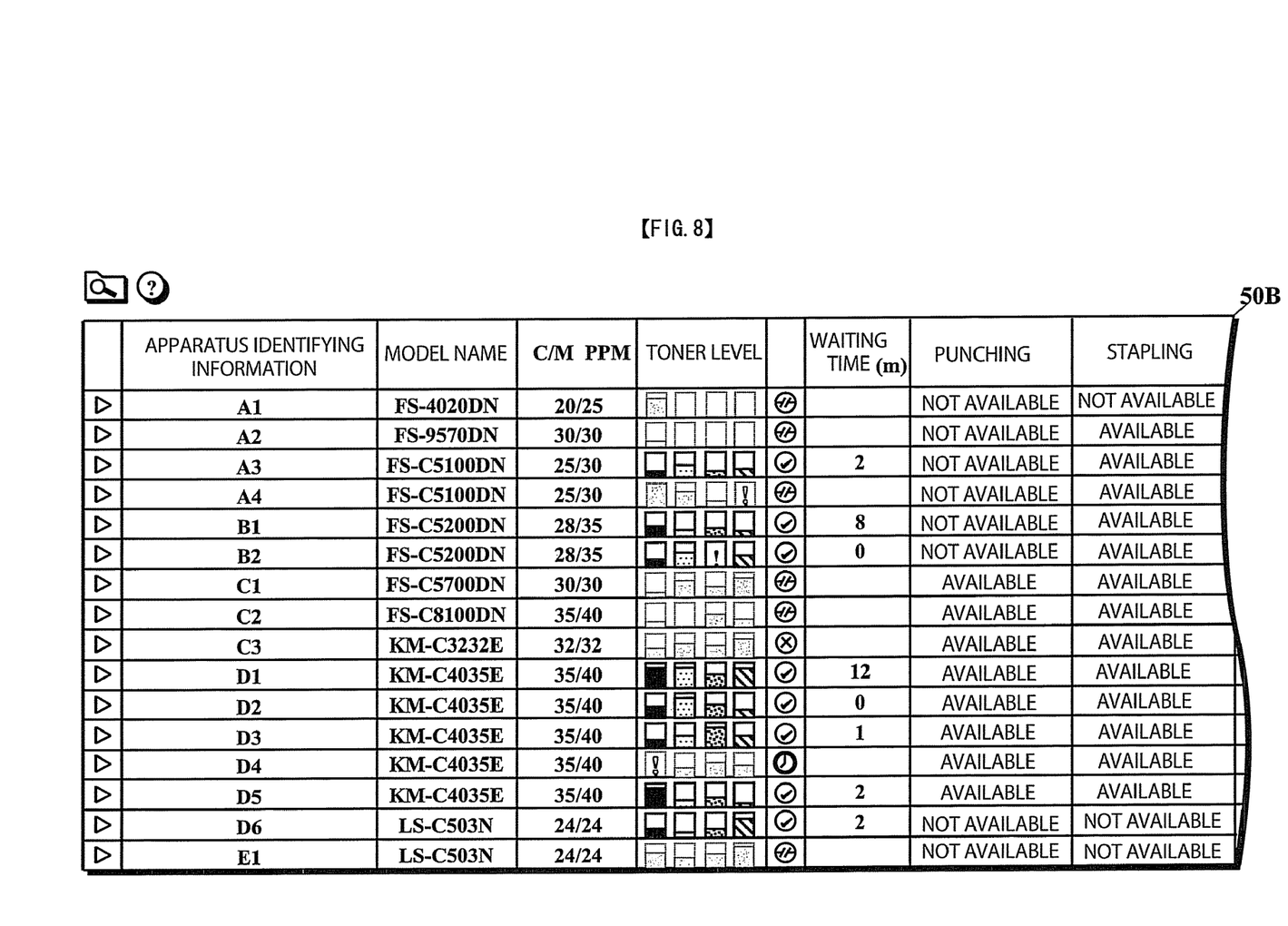
FIG. 8 is a schematic diagram of a display screen on which various types of information regarding each of a plurality of image forming apparatuses obtained from the image forming apparatus via a network is displayed according to a third embodiment of the present invention.

FIG. 8 is a display screen 50B on which various types of information regarding each of the plurality of image forming apparatuses obtained from the image forming apparatuses via a network is displayed according to a third embodiment of the present invention. The display screen 50B corresponds to the display screen 50A illustrated in FIG. 7.

In the display screen 50B, for each image forming apparatus, a portion of apparatus performance information is displayed so as to be aligned with icons representing C/M/Y/K toner levels. The display screen 50B includes, as device performance information, color/monochrome (C/M) printing speed (which is expressed in PPM), and availability of finishing-process functions (punching and stapling functions).

For an image forming apparatus that is ready to operate, an estimated value of print waiting time, which is expressed in minutes (m), is further displayed. Furthermore, apparatus state icons are aligned in a column adjacent to the column in which the icons representing the toner levels are displayed. The present configuration is similar to that of the second embodiment.

Fourth Embodiment

Figure 9:
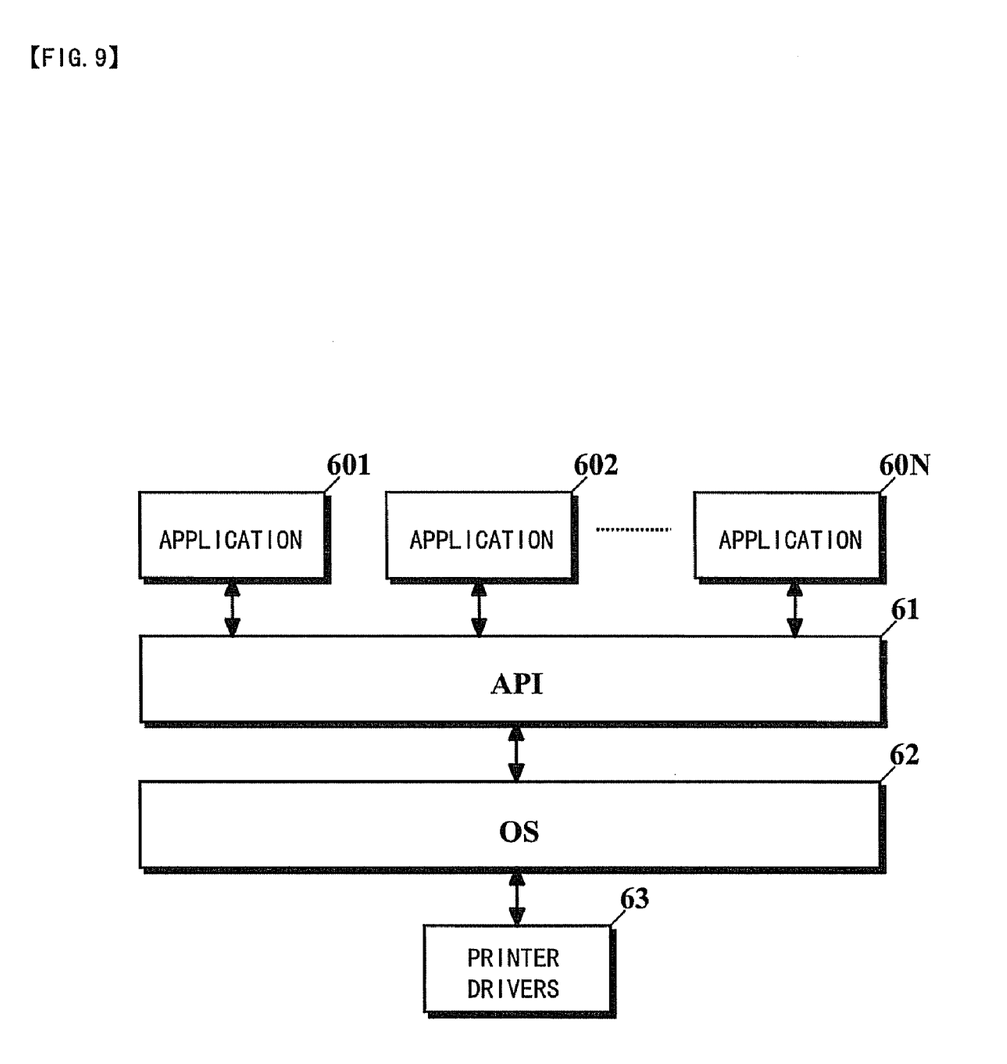
FIG. 9 is a schematic block diagram illustrating a software configuration according to a fourth embodiment of the present invention.

FIG. 9 is a schematic block diagram illustrating a software configuration according to a fourth embodiment of the present invention.

In any of a plurality of applications 601 to 60N, for example, in a PC, when a print toolbar, a print icon, or a print item in a file menu is clicked on using a pointing device, an application program interface (API) 61 is started. The API 61 includes a program having a function of displaying a display screen on which various types of information is displayed according to one of the first to third embodiments. For example, the image 60 of the image forming apparatus illustrated in FIG. 2(B) is double-clicked on using the pointing device. Then, a printer driver for the selected image forming apparatus among printer drivers 63 is started on an OS 62. If the printer driver has not been installed, the printer driver is automatically installed onto the PC by obtaining the printer driver from the selected image forming apparatus or the management apparatus 40, and is started. Thereafter, a print setting screen in the printer driver is displayed. When an OK button is clicked on, print data is supplied to the selected image forming apparatus through a LAN 10, and printing is performed.

The present invention includes various other embodiments. For example, other designs can be used in which the above-described components and steps are each performed.

By way of example, in the first, second and third embodiments, all PCs may directly obtain various types of information from image forming apparatuses. Alternatively, only the management apparatus 40 may obtain various types of information of each image forming apparatus such as toner levels, and PCs 301 and 302 may obtain the various types of information from the management apparatus 40.

Furthermore, the apparatus performance information may be displayed in a pop-up dialog instead of displayed in an accordion-like fashion. Alternatively, as illustrated in the third embodiment, the accordion-like fashion may not necessarily be used.

Additionally, in the fourth embodiment, a method for automatically installing a printer driver that has not been installed has been described. However, a user may manually install the printer driver after selecting an image forming apparatus.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming system comprising:
a plurality of image forming apparatuses connected to a network; and
an information processing apparatus connected to the network,
each image forming apparatus within the plurality of image forming apparatuses including a remaining-toner sensor for detecting remaining amounts of toner for cyan, magenta, yellow, and black in toner cartridges,
the information processing apparatus including
a storage device for storing various types of information regarding each of the plurality of image forming apparatuses obtained from the image forming apparatuses via the network, the various types of information including apparatus status information and apparatus identifying information, the apparatus status information including the remaining amounts of toner, and a display device for displaying icons representing the remaining amounts of toner for cyan, magenta, yellow, and black in first lines on a respective image forming apparatus basis, and displaying the icons representing the remaining amounts of toner for each image forming apparatus within the plurality of image forming apparatuses in second lines on a respective color basis;

wherein the first lines are perpendicular to the second lines.

2. The image forming system according to claim 1, wherein the icons representing the remaining amounts of toner comprise images illustrating the proportion of the remaining amounts of toner.

3. The image forming system according to claim 1, wherein the icons representing the remaining amounts of toner comprise color images corresponding to cyan, magenta, yellow, and black colors.

4. The image forming system according to claim 1, wherein the icons representing the remaining amounts of toner comprise predetermined images when the remaining amounts of toner have a predetermined value or less.

5. The image forming system according to claim 4, wherein the predetermined images comprise images representing an exclamation mark.

6. The image forming system according to claim 1,
wherein the plurality of image forming apparatuses includes at least one monochrome image forming apparatus, and
wherein the display device displays the remaining amounts of toner for the at least one monochrome image forming apparatus so that only the remaining amount of toner for black is displayed using an icon and so that the remaining amounts of toner for cyan, magenta, and yellow are displayed using empty icons.

7. The image forming system according to claim 1, wherein the display device further displays the apparatus identifying information in each of the first lines.

8. The image forming system according to claim 7, wherein the apparatus identifying information includes at least one of an identifier (ID) of the image forming apparatus, a name of a place where the image forming apparatus is installed, an internet-protocol (IP) address of the image forming apparatus, and a host name corresponding to the IP address.

9. The image forming system according to claim 1, wherein the apparatus status information further includes at least one of a network connection state of the image forming apparatus, an abnormal state indicating that the image forming apparatus is under an abnormal condition, and a ready-to-operate state indicating that the image forming apparatus is ready to operate.

10. The image forming system according to claim 9, wherein the display device further displays at least one of an icon representing the network connection state, an icon representing the abnormal state, and an icon representing the ready-to-operate state in the first lines in which the icons representing the remaining amounts of toner are displayed.

11. The image forming system according to claim 9, wherein when the image forming apparatus is disconnected from the network or is under an abnormal condition, the display device grays out the icons representing the remaining amounts of toner.

12. The image forming system according to claim 9, wherein the apparatus status information further includes a process waiting time of the image forming apparatus.

13. The image forming system according to claim 1, wherein the various types of information further include apparatus performance information.

14. The image forming system according to claim 13, wherein the apparatus performance information includes at least one of a printing speed, an availability of a duplex printing function, a capacity of a random-access-memory (RAM) storage medium, and an availability of a finishing-process function.

15. The image forming system according to claim 13, wherein the display device further displays the apparatus performance information corresponding to each image forming apparatus within the plurality of image forming apparatuses.

16. The image forming system according to claim 15, wherein in response to a selection of the first lines in which icons representing the remaining amounts of toner are displayed, the display device inserts a space between the selected first line and the first line adjacent to the selected first line, and displays the apparatus performance information regarding the image forming apparatus in the space.

17. The image forming system according to claim 16, wherein the display device further displays at least one of the apparatus identifying information and the apparatus status information in the space.

18. The image forming system according to claim 13, wherein the display device further displays the apparatus performance information in each of the first lines.

19. The image forming system according to claim 13, wherein the display device further displays the apparatus performance information in a pop-up dialog.

20. The image forming system according to claim 1, wherein the icons representing the remaining amounts of toner comprise a mark "X" when a toner cartridge is not mounted in the image forming apparatus.

* * * * *